(12) United States Patent
Brown

(10) Patent No.: US 9,094,322 B2
(45) Date of Patent: Jul. 28, 2015

(54) FIRST PARTY COOKIE SYSTEM AND METHOD

(71) Applicant: Nomi Corporation, Norcross, GA (US)

(72) Inventor: Eric Brown, Somerville, MA (US)

(73) Assignee: Nomi Corporation, Norcross, GA (US)

( * ) Notice: Subject to any disclaimer, the term of this patent is extended or adjusted under 35 U.S.C. 154(b) by 0 days.

(21) Appl. No.: 14/455,730

(22) Filed: Aug. 8, 2014

(65) Prior Publication Data

US 2014/0351405 A1    Nov. 27, 2014

Related U.S. Application Data

(63) Continuation of application No. 13/886,236, filed on May 2, 2013, now abandoned.

(51) Int. Cl.
*G06F 15/16* (2006.01)
*H04L 12/721* (2013.01)
*H04L 29/08* (2006.01)

(52) U.S. Cl.
CPC ............ *H04L 45/14* (2013.01); *H04L 67/02* (2013.01); *H04L 67/14* (2013.01); *H04L 67/2814* (2013.01)

(58) Field of Classification Search
CPC ...... H04L 67/14; H04L 67/02; H04L 67/2814; G06Q 30/02; G06Q 30/0277; G06Q 30/0241; G06Q 30/0253
USPC ............... 709/200–203, 217–227, 228
See application file for complete search history.

(56) References Cited

U.S. PATENT DOCUMENTS

| | | | | |
|---|---|---|---|---|
| 6,584,505 | B1 * | 6/2003 | Howard et al. | 709/225 |
| 7,016,960 | B2 * | 3/2006 | Howard et al. | 709/225 |
| 7,418,502 | B2 * | 8/2008 | Howard et al. | 709/225 |
| 7,783,719 | B2 * | 8/2010 | Miller | 709/217 |
| 7,904,520 | B2 * | 3/2011 | Neal et al. | 709/206 |
| 8,131,861 | B2 * | 3/2012 | Butler et al. | 709/228 |
| 8,583,749 | B2 * | 11/2013 | Neal et al. | 709/206 |
| 8,880,710 | B2 * | 11/2014 | Goldspink et al. | 709/228 |
| 2001/0045451 | A1 * | 11/2001 | Tan et al. | 235/375 |
| 2009/0024737 | A1 * | 1/2009 | Goldspink et al. | 709/224 |
| 2011/0029382 | A1 * | 2/2011 | Narasimhan et al. | 705/14.52 |
| 2014/0108165 | A1 * | 4/2014 | Neal et al. | 705/14.73 |
| 2014/0244387 | A1 * | 8/2014 | Patton et al. | 705/14.53 |

* cited by examiner

*Primary Examiner* — Moustafa M Meky
(74) *Attorney, Agent, or Firm* — Morris, Manning & Martin, LLP

(57) ABSTRACT

A first party cookie system and method are provided, The system and method allow a third party to be able to drop a cookie on a computer in a privacy-compliant fashion thereby increasing the acceptance rate of cookies on computing devices.

14 Claims, 8 Drawing Sheets

```
# Nginx Temporary First Party Redirect
# we can do this for all requests or those that go to the root domain, this is configurable
# listen on root domain
server{
    listen *:80;
    listen *:443;
    server_name clientx.com; #$hostname
    return 301 $scheme://clientx.copilot.mediaarmor.com$request_uri;
} temporary first party with redirect logic based on cookie status
server{
    listen *:80;
    listen *:443;
    server_name clientx.copilot.mediaarmor.com; #$hostname
    if ($http_cookie ~* "mauid") {
        return 301 $scheme://www.clientx.com$request_uri;
    }
    add_header Set-Cookie "mauid=0;Domain=.mediaarmor.com;Path=/;Max-Age=157680000";
    add_header Set-Cookie "masid=0;Domain=.mediaarmor.com;Path=/;Max-Age=157680000";
    return 301 $scheme://www.clientx.com$request_uri;
} final destination
server {
    listen      *:80;
    listen      *:443;
    server_name www.clientx.com; #$hostname
    client_header_timeout 300;
    client_body_timeout   300;
    send_timeout          300;
    root /nfs/firstparty/public_html;
    index index.php
    try_files $uri $uri/ /$uri;
    location ~ \.php$ {
        include       ../conf/fastcgi_params;
        fastcgi_pass  unix:/tmp/php-fpm.sock;
        fastcgi_param PATH_TRANSLATED $document_root$fastcgi_script_name;
        fastcgi_param SCRIPT_NAME $fastcgi_script_name;
        fastcgi_param PATH_INFO /$request_uri;
    }
    access_log logs/clientx.access.log main;
    error_log logs/clientx.error.log;
}
```

FIGURE 5

```
<?php
/*
 * The code sample below is illustrative of how to create a first-party
redirect
 * to a mediaarmor site.
 *
 * This example code is written i PHP
 */
/* Configurable Options */
$main_host_subdomain = 'www';
$main_host = 'clientx.com';
$media_armor_client_host = 'clientx';
$redirect_on_all_pages = true;

/*
 * This function determines whether or not a URL is secure or not to
retain the protocol
 */
function is_https(){
    $is_https = false;
    // Make sure we are on HTTPS. Check the
HTTP_X_FORWARDED_PORT for live when we are using load
balancing,
    // and SERVER_PORT when we are on a dev environment that does
not using load balancing
    if ( isset( $_SERVER['HTTP_X_FORWARDED_PORT'] ) &&
$_SERVER['HTTP_X_FORWARDED_PORT'] == '443' ){
        $is_https = true;
    } elseif ( !isset( $_SERVER['HTTP_X_FORWARDED_PORT'] ) && isset(
$_SERVER['SERVER_PORT']) && $_SERVER['SERVER_PORT'] == "443" )
{
        $is_https = true;
    }
    return $is_https;
}
```

FIGURE 6A

```
/* Configuration Setup */

// Determine the host of the current request
$current_host = $_SERVER['HTTP_HOST'];

// Determine the protocol of the current request
$protocol = (is_https()) ? 'https' : 'http';

// Build the client specific Media Armor URL to redirect a browser to
$media_armor_redirect_url = $media_armor_client_host . '.mediaarmor.com';

// Split the sudomain if anny from the current host
list($subdomain, $rest) = explode('.', $current_host, 2);

// Verify we are on the Media Armor redirect url
if(preg_match("/$media_armor_redirect_url/i", $_SERVER['HTTP_HOST'])){

// Ensure that we want to do a redirect, either on all pages or just the
    // root page.
    if ($redirect_on_all_pages == true || !isset($_SERVER['REQUEST_URI'])){

// Check to see if there is a Media Armor cookie. If no cookie, set a
        // default cookie with an ID of 0
        if (!isset($_COOKIE["mauid"])){

// Set cookie expiration for 5 years
            $cookie_expiration = time() + 86400 * 365 * 5;

// Attempt to set the cookie for the Media Armor domain
            setcookie("mauid",0,$cookie_expiration,"/",".mediaarmor.com");
        }
```

FIGURE 6B

```
// This must get called before any output to the browser
    // Permanent redirect to the main host site
    header("Location: " . $protocol . "://" . $main_host_subdomain . "." . $main_host,TRUE,301);
}
// Verify we aren't on the main host subdomain and redirect to the Media Armor
// First Party client specific url.
elseif(!preg_match("/$main_host_subdomain/i",$subdomain)){
    // This must get called before any output to the browser
    // Temporary redirect
    header("Location: " . $protocol . "://" . $media_armor_redirect_url,TRUE,302);
}
```

FIGURE 6C

FIRST PARTY COOKIE SYSTEM AND METHOD

CROSS REFERENCE TO RELATED APPLICATION

This application is a continuation of, and claims priority to, pending U.S. patent application Ser. No. 13/886,236, filed on May 2, 2013, entitled "First Party Cookie System and Method," which is incorporated herein by reference in its entirety.

FIELD

The disclosure is directed to a system and method for placing a first party cookie fro a third party onto a computing device of a user.

BACKGROUND

In order to track browser-level data, marketers, vendors, and any web-based systems rely on a piece of data, known as a cookie, that is stored on the computer that executes a web request from a browser for many tracking and measurement activities. Cookies are text files that contain information used by web browsers. When a party owns a Property and downloads and stores (drops) a cookie on someone visiting the Property (e.g. The New York Times drops a cookie on a user when the user visits The New York Times website), that cookie is a $1^{st}$-party cookie. When a third party firm, such as an advertiser, drops a cookie on the user when they visit The New York Times website, that cookie is considered a $3^{rd}$-party cookie.

Some browsers do not accept cookies, either by default or due to consumer privacy settings. While not accepting cookies does affect the ability of $1^{st}$-parties to drop cookies, it has a particularly adverse impact on the ability of third parties to drop cookies and track consumer behavior. Furthermore, it appears likely that browsers may soon block 3rd-party cookies. Thus, it is desirable to provide a system and method that allows a third party to drop a cookie on a computer (as a first party) so that the third party can track the user.

An example of a third party who would like to be able to track a user are advertisers. Over the course of history, advertisers have invested dollars in advertising, regardless of their ability to track the effects of their efforts. As advertising began shifting from print to digital, the ability to track consumer behavior improved as well. For example, advertisers began to measure television exposure through household tracking efforts via Nielsen panels, or viewership penetration directly through cable boxes. With the addition of web-based marketing opportunities, including search, email, affiliate and display, web-based tracking efforts became focused on browser-level data as contrasted with household-specific information.

Today, traditional web technology vendors mainly employ $3^{rd}$-party cookies. Of prior known technology attempts to develop a $1^{st}$-party cookie by a $3^{rd}$-party web technology vendor (i.e. Google, Dotomi (now VCLK), Omniture), all involve either working with a property owner/advertiser to allow for the technology to create a general $1^{st}$-party cookie, or one based on a subdomain such as vendor.marketer.com. These solutions improve the web technology vendors ability to track within the constraints of the site within which data is being collected. However, this solution fails with respect to acquiring global access to data. That is, these solutions do not allow for the identifier and data captured to be read outside of the site within which data was originally collected.

BRIEF DESCRIPTION OF THE DRAWINGS

FIG. 5 is an example of a piece of configuration code that may implement the first party cookie system in one embodiment; and FIGS. 6A-6C are an example of a piece of code that performs the method shown in FIGS. 3 and 4 in another embodiment of the first party cookie system.

DETAILED DESCRIPTION OF ONE OR MORE EMBODIMENTS

The disclosure is particularly applicable to a cloud based system for first party cookies and it is in this context that the disclosure will be described. It will be appreciated, however, that the system and method has greater utility, such as to the advertising industries and other industries in which it is desirable for a third party to be able to drop a first party cookie onto a computer of a user. Furthermore, the system and processes described below may be implemented on physical hardware and the physical hardware implements the processes described below.

Figure 1:
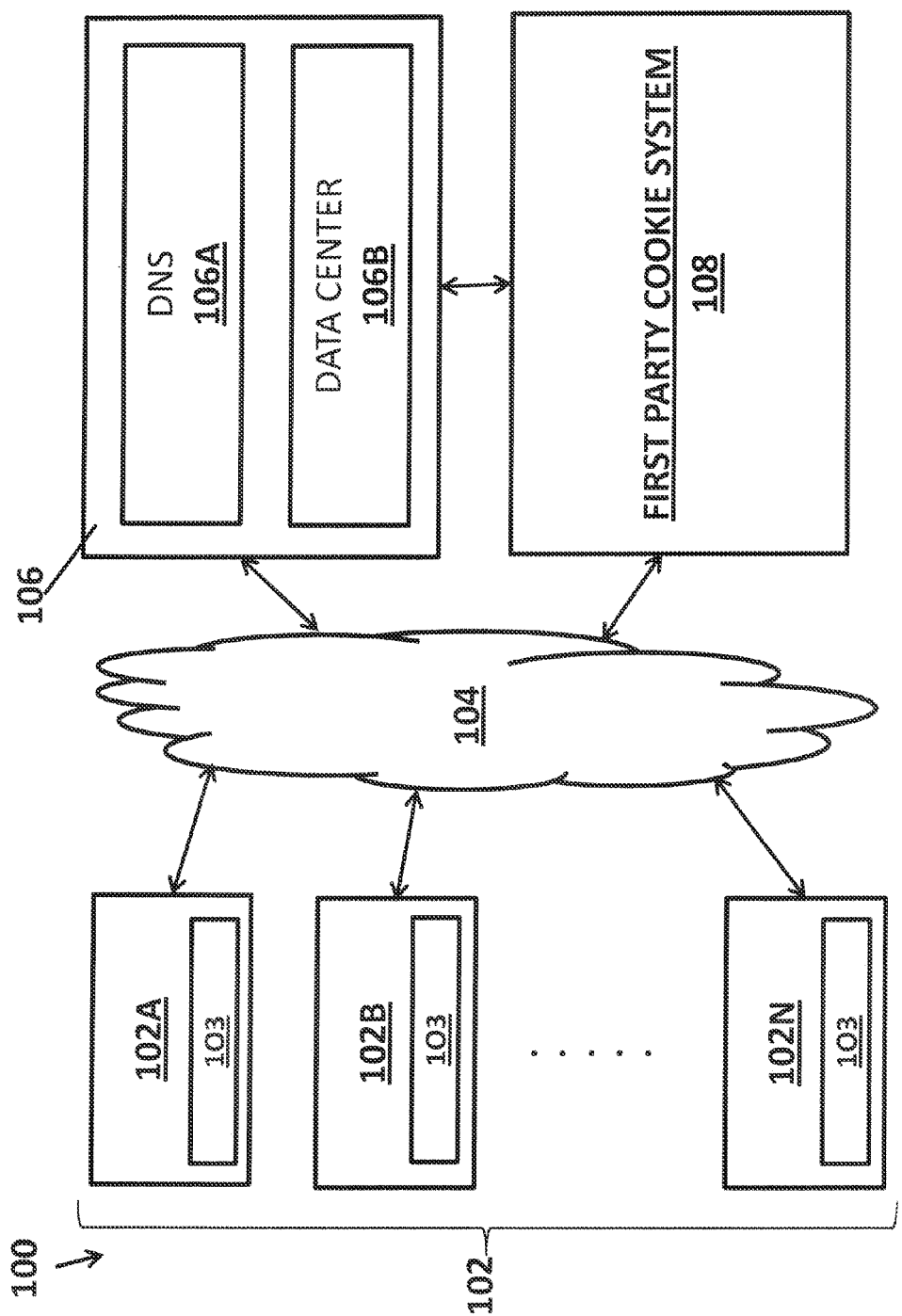
FIG. 1 illustrates an implementation of a system that may incorporate a first party cookie system.

FIG. 1 illustrates an implementation of a system 100 that may incorporate a first party cookie system 108. The system may have one or more computing devices 102, such as computing device 102A, 102B, . . . , 102N as shown in FIG. 1, that may each be used by a user to access a property 106 of an entity, such as a web site, over a communications path 104. The communications path 104 may be a wired or wireless path, For example, the communications path 104 may be the Internet, a Ethernet network, a wireless data network, a cellular data network, a computer network, a WiFi network and the like.

Each computing device 102 may be a device that has at least one processor, memory, a persistent storage device, such as a hard disk drive, optical drive, flash memory, etc., a display and circuits that allow the computing device 102 to connect to and communicate over the communications path 104 with the property 106. For example, each computing device may be a smartphone device (such an Apple® iPhone®, Android® OS based device, Nokia® device, etc.), a tablet computer, a personal computer, a terminal, a server computer, a game system/console and other internet connected devices that have the capability to connect to and interact with the property 106. In one implementation, each computing device may store a browser application 103 that may be executed by the processor of the computing device and used to interact with the property 106, Each computing device 102 may also store one or more cookies as described below in more detail. A cookie is a small data file stored on the computing device by a property navigated to by the browser. The cookie is placed to allow the browser to be recognized on repeat visits to the property or repeat purchases from the property. Each cookie has an owner that is domain specified in the cookie.

The property 106 of the entity may be a website that the entity maintains so that the users may interact with the website and possibly purchase goods or services from the website or receive information/submit information from or to the property. The property may include a known domain name server (DNS) system 106A and a data center 106B that has the other systems that generate the webpages of the website, store user data and the like. For example, the property 106 may have one or more web servers, one or more application servers, one or more database servers and the like.

The first party cookie system 108 may be coupled to the property 106 and the communications path 104 on that the first party cookie system 108 may interact with the property 106 and the computing devices 102 of the user as described below in more detail. The first party cookie system 108 may have one or more web servers, one or more application servers and one or more database servers. Each of the servers may be implemented using cloud computing components and/or physical hardware components in a data center that have the known components of computing resources such as one or more processors, memory and the like. The first party cookie system 108 may be implemented using any operating system, such as any variants of Windows, Mac ox, linux and its variants. A software implementation of the first party cookie system 108 may be carried out using various programming languages such as PHP, Perl, Java, C, C++, Ruby, ASP, C# and others. The first party cookie system 108 may be implemented using various web servers such as Nginx, Internet Information Services IIS), Apache, Lighthttpd and others either natively or through the addition of modules for handling http requests, redirects and cookie manipulation. The first party cookie system 108 may further comprise a DNS component (described in more detail with reference to FIG. 2) and a cookie management component that participates in the method shown in FIG. 3. In one implementation, the cookie management component may be a plurality of lines of computer code that may be executed by a processor of the computer system of the first party cookie system.

When a user interacts with the property 106 using the browser, the owner of the property may download and store a cookie on the computer of the user (known as a first party cookie) that allows the owner of the property to track the user when the user is on the property 106. In addition to these first party cookies, various third parties, such as advertisers, may also try to download and place a cookie onto the computing device of the user (known as a third party cookie) for the same tracking reasons. The cookies of the third parties allow consumer navigation actions to be tracked across any property and across any computing device of the user so that the third party can display ads or other information to the user based on the global tracking of the user. However, some browsers may be configured to reject any third party cookies due to security concerns. The first party cookie system 108, interacting with the property 106 and a computing device 102, allows a third party to download and store a first party cookie on the computing device as described below (even though the advertiser is a third party) so that the third party is still able to track a user based on the cookie. The third party may be an advertiser, any system, any entity or any site that is not the property 106. The first party cookie system 108 (using the computing resources of the first party cookie system 108) may implement a first party cookie methodology that enables the reading of the identifier and associated data globally that is important on a number of levels for the third parties.

The methodology allows for a greater number of browsers to accept a cookie. In recent months, there have been a series of decisions made by technology vendors who provide web browsing platforms (including Mozilla's Firefox and Microsoft's Internet Explorer) to automatically block $3^{rd}$-party cookies upon start-up and/or installation (if cookie acceptance is set to 'ON'). These decisions were made without unified agreement between the IAB (Internet Advertising Bureau), the FCC (Federal Communications Commission), and consumers themselves. As a result of these new browser rules, there is a clear and present danger of Marketers, Vendors, and any Web-based Properties no longer being able to identify, track, or capture data consistently and persistently across time, and, if relevant, potentially no longer able to offer their services. The first party cookie system described below addresses this issue.

The methodology also enables a greater number of browsers to accept a cookie, and therefore be identified in a global fashion. Identification is key aspect for any Marketer, Vendor, or Web-based Property to anonymously identify who is visiting a site, for how long, over what time period, and any other associated metrics with Web-based interaction (including but not limited to general browsing, email, affiliate, and search). As the cookie represents a global identifier, the browser can now be recognized on any Web Property or Web Platform. In addition, any information captured can be aggregated across all digital interactions and the browser's associated data recognized on any Web Property or Web Platform. Furthermore, any information can be tracked across all digital interactions and the browser's associated data recognized on any Web Property or Web Platform. The method allows the cookie's associated identifier and data captured to be used in Advertising Opportunities. The advertising opportunities may include, for example, email marketing, search marketing, affiliate marketing, and display advertising (including but not limited to Run-Of-Network, Acquisition, Remarketing/Retargeting, Retention, Search Retargeting, and Search Remarketing).

Figure 2:
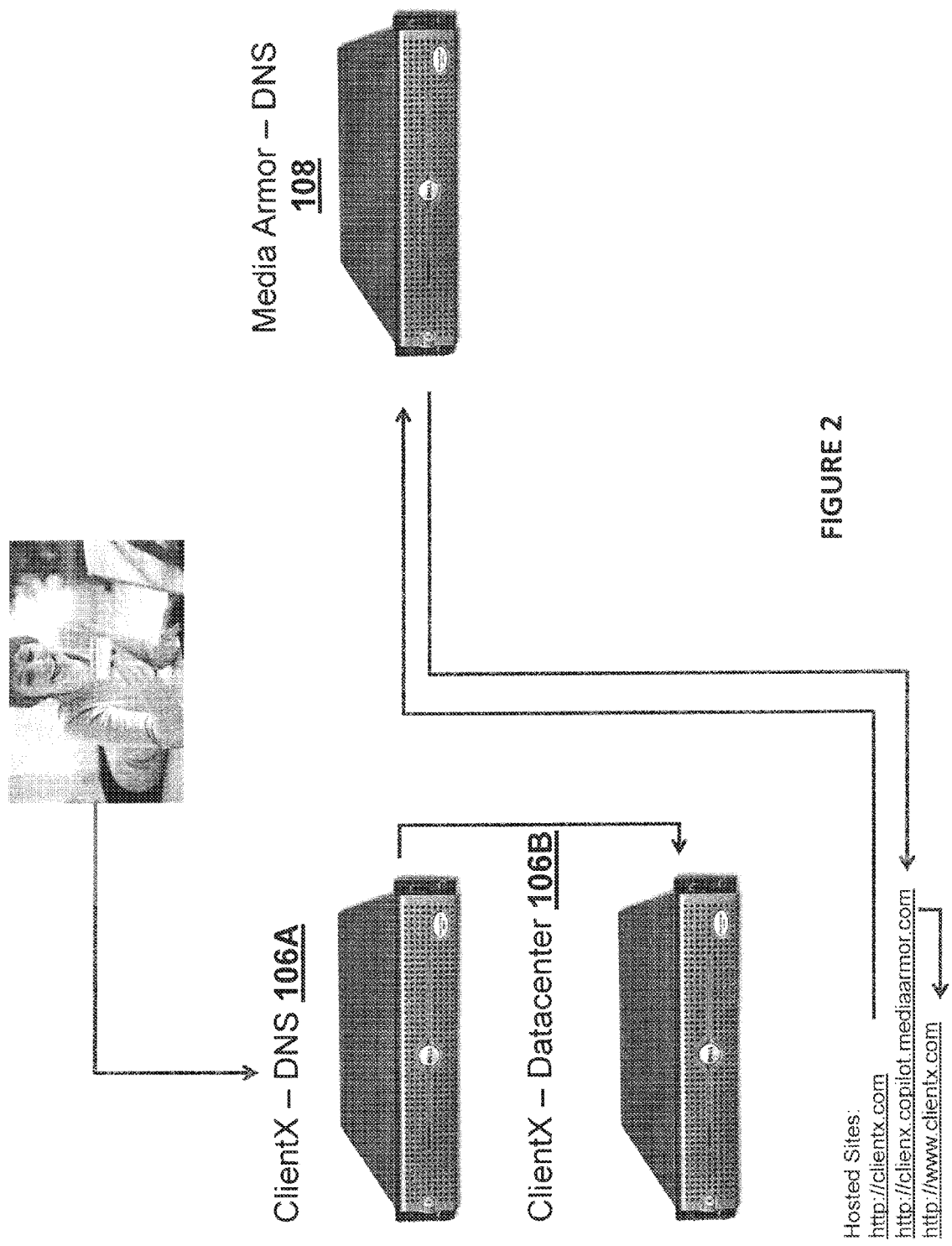
FIG. 2 illustrates an example of a process for dropping a first party cookie using the first party cookie system.
Figure 3:
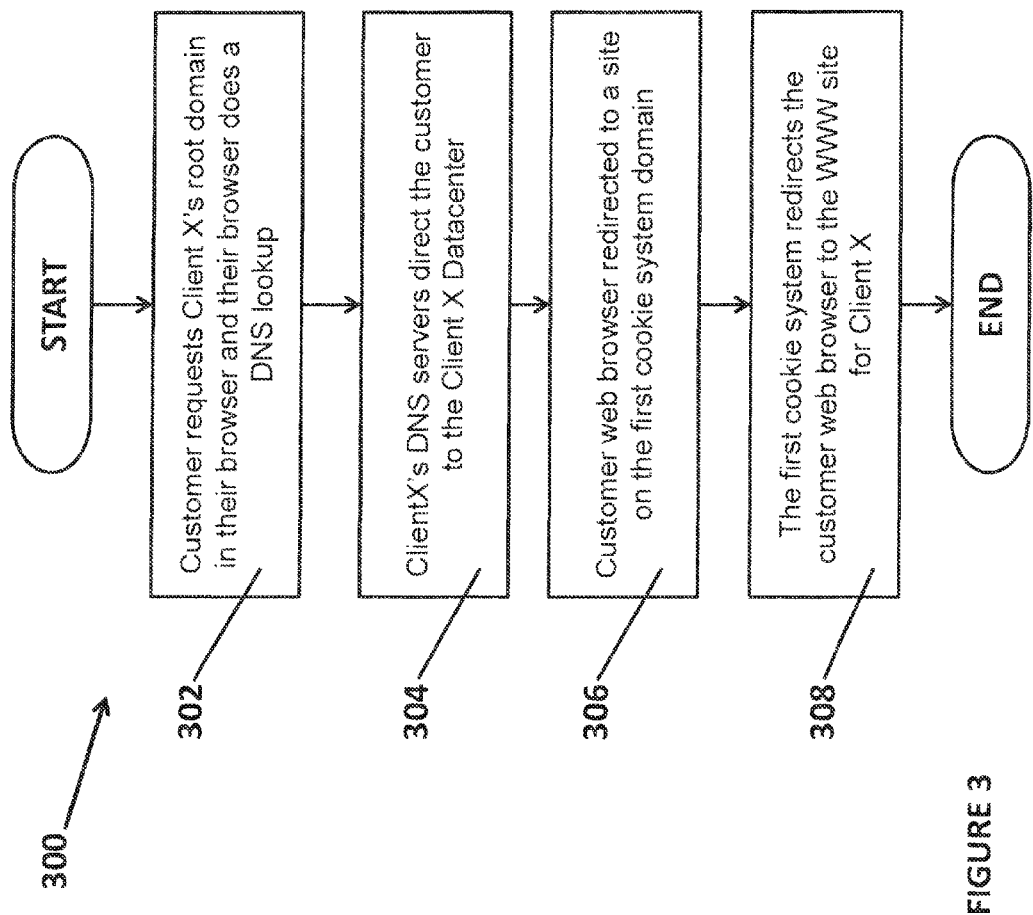
FIG. 3 is a flowchart illustrating the process for dropping a first party cookie using the first party cookie system.

FIG. 2 illustrates an example of a process for dropping a first party cookie using the first party cookie system and FIG. 3 is a flowchart illustrating a process 300 for dropping a first party cookie using the first party cookie system. The method/process 300 shown in FIG. 3 may be carried out by the computing resources of the property 106 and the computing resources of the first party cookie system 108 (and more specifically the cookie management component.) In this example, Client X is a hypothetical property of an entity, such as a website of an entity. In the method, a computing device with a browser, based on a user's action, requests a root domain for Client X (302) and the browser does a well-known DNS lookup. In the method, the DNS system of Client X directs the browser of the customer to a datacenter of Client X (304.) At the data center, the browser of the user is redirected to a site on a domain of the first party cookie system (306). In one implementation, the browser may be redirected to a sub-domain of the first party cookie system. In another implementation, the browser may be redirected to a sub-domain of the first party cookie system that is specifically for the particular property.

The first party cookie system may be implemented in two different ways to implement the redirection. In a first implementation, a new configuration of the web server of Client X (an example of which is shown in FIG. 5) so that requests on the root domain (such as http://clientx.com) may be redirected to a corresponding first party cookie subdomain (such as http://clientx.copilot.mediaarmor.com.) This redirection allows the computing device of the user to consider the advertiser, such as Media Armor in the example above, to be a first party at which point requests can be redirected to a production site of the property (such as http://www.clientx.com.) This also allows the third party to drop a cookie onto the computing device and the cookie is considered to be a first party cookie.

In the second implementation, code of the property website may be changed (an example of the changed code in shown in FIGS. 6A-6C) so that requests on the root domain such as http://clientx.com) may be redirected to a corresponding first party cookie subdomain (such as http://clientx.copilot.mediaarmor.com.) This redirection allows the computing device of the user to consider the advertiser, such as Media Armor in the example above, to be a first party at which point requests can be redirected to a production site of the property (such as http://www.clientx.com.) This also allows the third party to drop a cookie onto the computing device and the cookie is considered to be a first party cookie.

Returning to FIGS. 2 and 3, after the browser is redirected to a site or subdomain of the first party cookie system, the browser may be then further redirected to WWW site of Client X (308.) Thus, the computing device of the user has a cookie from the advertiser that is treated as a first party cookie, but the browser continues onto the WWW site of Client X and thus continues the browsing of the user. FIG. 2 has examples of the IP addresses that may be used in the system.

Figure 4:
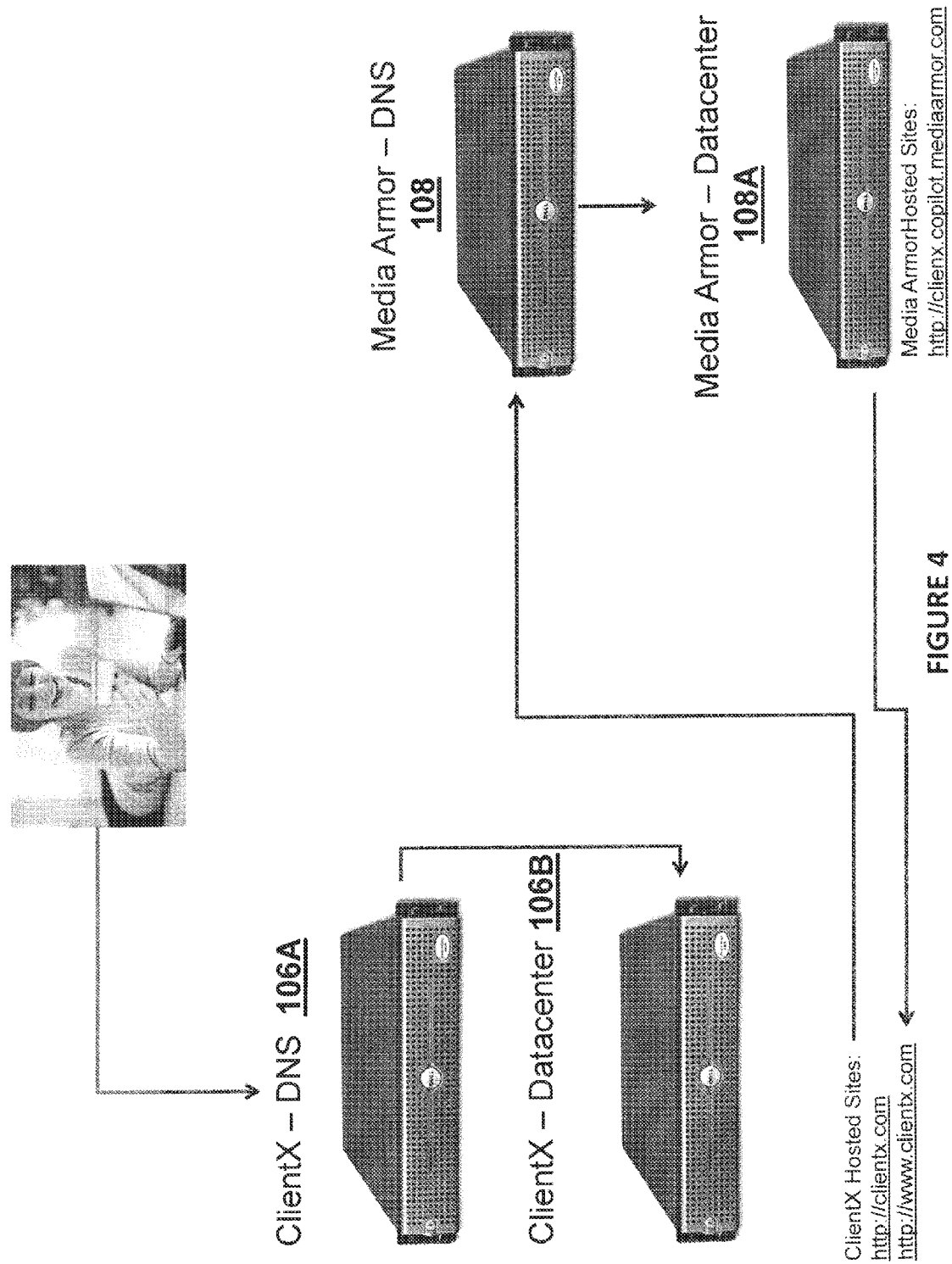
FIG. 4 illustrates an example of another process for dropping a first party cookie using the first party cookie system.

FIG. 4 illustrates an example of another process for dropping a first party cookie using the first party cookie system, As with the process shown in FIG. 2, the process may be implemented by changing the code of the web server (an example of which is in FIG. 5) or by changing the code of the property (an example of which is in FIGS. 6A-6C.) In this example, Client X is a hypothetical property of an entity, such as a website of an entity. During the process, a customer requests ClientX's root domain in their browser (such as http://clientx.com) and their browser does a DNS lookup on ClientX's DNS servers, In both the processes in FIGS. 2 and 4, the client may request any page of the ClientX property that can be redirected. The ClientX's DNS servers direct the customer web browser to the ClientX Datacenter where web servers host their site (such as http://clientx.com). The ClientX web server (with changed code) or code on the ClientX site listening to traffic on the root domain (http://clientx.com) redirect the customer web browser to a site on a domain of the first party cookie system (such as http://clientx.copiilot.mediaarmor.com). This site is hosted in the first party cookie system datacenter and routes based on first party cookie system DNS. The first party cookie system ClientX site redirects the customer web browser via code or the web server to the desired site for client X.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system, comprising:
   a computer-based first party cookie system;
   one or more computing devices, wherein each computing device is capable of storing a cookie that is used to track navigation of the computing device to one or more properties and has a browser executed on the computing device that is capable of navigating the computing device to the one or more properties;
   each of the one or more properties having a web server and a domain name server, wherein the domain name server redirects the browser to the computer-based first party cookie system; and
   the computer-based first party cookie system further comprising a cookie management component that drops a cookie onto the computing device as a first party when the browser is redirected to the computer-based first party cookie system and redirects the browser to the web server of the property.

2. The system of claim 1, wherein the web server of each property has a piece of configuration code that redirects the browser to the computer-based first party cookie system.

3. The system of claim 1, wherein each property has a piece of code that redirects the browser to the computer-based first party cookie system.

4. The system of claim 1, wherein each property is a website.

5. The system of claim 1, wherein each computing device is one of a smartphone device, a tablet computer, a personal computer, a terminal, a server computer, a game console and internet connected devices.

6. The system of claim 1, wherein the first party cookie system has a subdomain to which the browser is redirected.

7. The system of claim 6, wherein the subdomain is a subdomain on the first party cookie system associated with the property.

8. A method for dropping first party cookies by a third party, the method comprising:
   performing, in response to a request from a browser of a computing device, a domain name lookup by a domain name server of the property;
   redirecting, by the property, the browser to a first party cookie system;
   dropping, by the first party cookie system, a first party cookie onto the computing device; and
   redirecting, by the first party cookie system, the browser to a web server of the property.

9. The method of claim 8 further comprising requesting, by the browser of computing device, a root domain of the property.

10. The method of claim 8, wherein redirecting the browser to the first party cookie system further comprises redirecting, by the property, the browser to a subdomain of the first party cookie system.

11. The method of claim 10, wherein redirecting the browser to a subdomain of the first party cookie system further comprises redirecting, by the property, the browser to a subdomain of the first party cookie system associated with the property.

12. The method of claim 8, wherein redirecting the browser to the first party cookie system further comprises redirecting, by configuration code on a web server, the browser to the first party cookie system.

13. The method of claim 8, wherein redirecting the browser to the first party cookie system further comprises redirecting, by code on the property, the browser to the first party cookie system.

14. The method of claim 8, wherein each property is a website.

* * * * *